United States Patent [19]
Offenbroich

[11] 3,915,579
[45] Oct. 28, 1975

[54] FASTENING DEVICE FOR DETACHABLE JOINING A CONNECTING ELEMENT AND AT LEAST ONE ELONGATED PART BY MEANS OF A SCREWED CONNECTION

[76] Inventor: Adrian Gottfried Offenbroich, Sodra Forstadsgatan 49, 211 43 Malmo, Sweden

[22] Filed: Feb. 12, 1974

[21] Appl. No.: 441,792

[30] Foreign Application Priority Data
Aug. 14, 1972 Sweden.............................. 10505/72

[52] U.S. Cl. ................ 403/264; 52/656; 52/758 H
[51] Int. Cl.² ........................................... F16B 9/00
[58] Field of Search............ 403/187, 264, 169–174, 403/176–178, 8, 217; 52/656, 758 D, 758 H, 475

[56] References Cited
UNITED STATES PATENTS
3,580,620   3/1970   Offenbroich.................... 403/264 X FOREIGN PATENTS OR APPLICATIONS
1,477,591   3/1967   France............................... 403/187
57,598      2/1953   France............................... 403/264
940,398     12/1948  France............................... 403/264
28,577      11/1884  Germany................................ 403/8
1,361,398   4/1964   France............................... 403/187
1,948,240   4/1971   Germany.......................... 403/187

*Primary Examiner*—Werner H. Schroeder
*Assistant Examiner*—Wayne L. Shedd

[57] ABSTRACT

A fastening device for detachably joining a connecting element and at least one elongated part. A screwed connection is utilized to realize joining. The screwed connection may comprise a screw adapted to be screwed into the connecting element, or a nut and a screw, the latter having one or more hooks for engagement with an engageable edge of the connecting element. The elongated part is formed with a longitudinal cavity adapted to receive the screw, which cavity is open over some distance to the end of the elongated part where the joint is to be established and which is in communication with a lateral opening formed in the elongated part and separated from the open cavity end of the part. A butting member bearing against the edge surface of the lateral opening cooperates with the screw and the nut, respectively, and urges the elongated part against the connecting element when the screwed connection is tightened.

4 Claims, 10 Drawing Figures

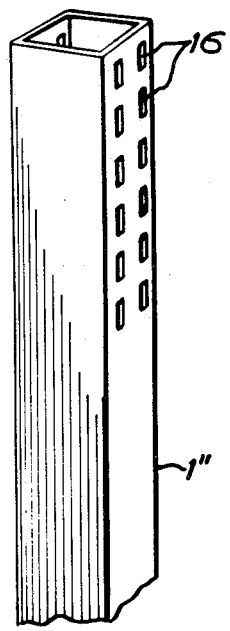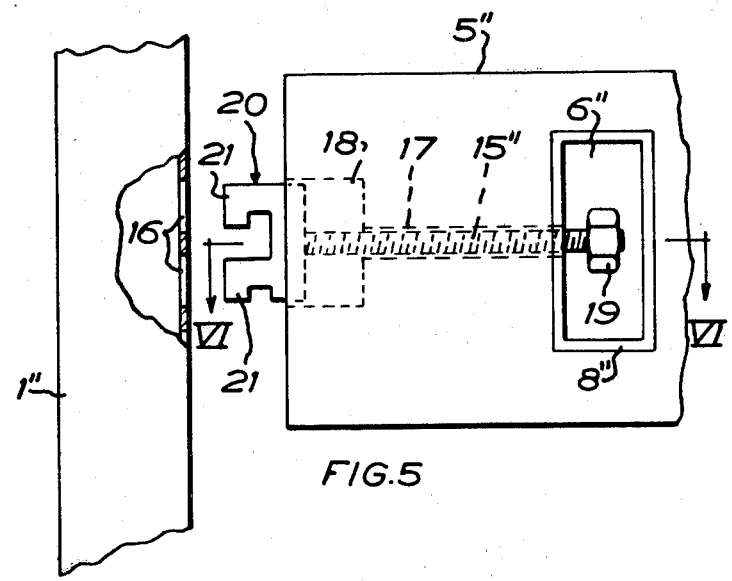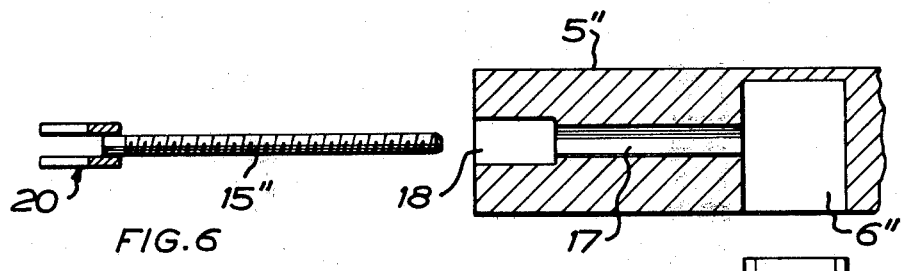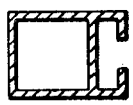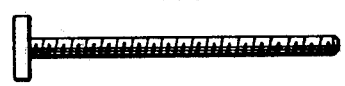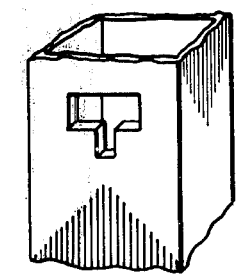

FASTENING DEVICE FOR DETACHABLE JOINING A CONNECTING ELEMENT AND AT LEAST ONE ELONGATED PART BY MEANS OF A SCREWED CONNECTION

This invention relates to a fastening device for detachably joining, with the aid of a screwed connection, a connecting element and at least one elongated part having a longitudinal cavity which is open over at least some distance to that end of said part where the joint is to be established and which is laterally defined by at least two opposed walls.

Several devices of this type have already been suggested for the assembly of furniture frames, racks and supports for shelving and display stands but they usually suffer from drawbacks in point of manufacture or mounting and, as a consequence, are often expensive and/or difficult to handle. Moreover, several of these prior art devices do not impart the requisite strength to the joint and have undesirable excrescences.

The present invention has for its object to provide a fastening device of the type outlined in the foregoing, which is well suited for joining elongated parts of closed or open profiles, as viewed in cross section, by means of a connecting element and which, contrary to the devices already suggested, is advantageous in point of manufacture and mounting and also imparts a fully satisfactory strength to the joint.

According to the invention, the elongated part in at least one of its opposed walls has an opening which is separated from that end of said part where the joint is to be established, and a butting member fitting between the walls is adapted to engage the edge surface of said opening close to the open end of said part by the intermediary of a shoulder which protrudes beyond said edge surface, said butting member having a through hole directed towards the open end of said part and adapted to receive a screw comprised in the screwed connection which can be tightened through said opening and which connects the butting member and the connecting element and, when tightened, pulls the butting member and, as a consequence, said part towards the connecting element.

The screwed connection may be tightened in that the screw is screwed into a screw-threaded hole in the connecting element. Alternatively, the connecting element may have at least one engageable edge while the screw at the end of the elongated part where the joint is to be established has hook means including at least one hook for engagement with said edge, the screw being tightenable by means of a nut which is accessible through the opening in the elongated part. More precisely, the connecting element in the latter case may be a tube of quadrangular cross-section formed in a known manner in at least some of its sides with groups of adjacent openings having engageable edges. The connecting elements may also be U-shaped bars or may present opposed flanges.

The invention will now be more fully described hereinbelow with reference to the accompanying drawings in which:

FIG. 4 is a perspective view of a prior-art connecting element;

FIG. 5 is a side view of a further embodiment of the present invention;

FIG. 6 is an exploded cross-sectional view on the line VI—VI in FIG. 5;

FIG. 7 is a cross-sectional view of a further connecting element useful for the purpose of the invention;

FIG. 8 shows the design of the screw for the connecting element shown in FIG. 7;

FIG. 9 is a side view of a still further connecting element useful for the purposes of the invention.

Figure 1:
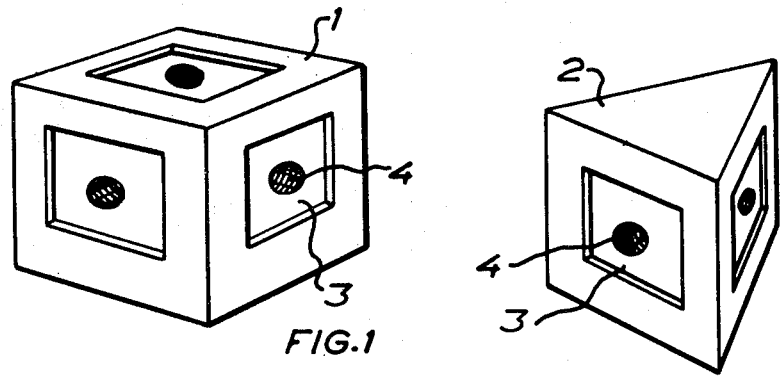
FIG. 1 shows two embodiments of a connecting element for the fastening device according to the invention.
Figure 2:
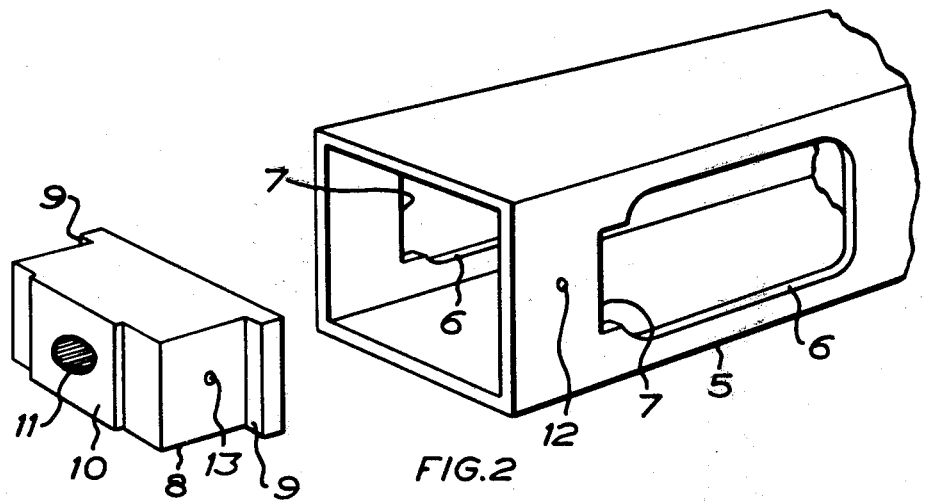
FIG. 2 shows the invention applied to tubes of quadrangular section and how the tube and the butting member are constructed.
Figure 3:
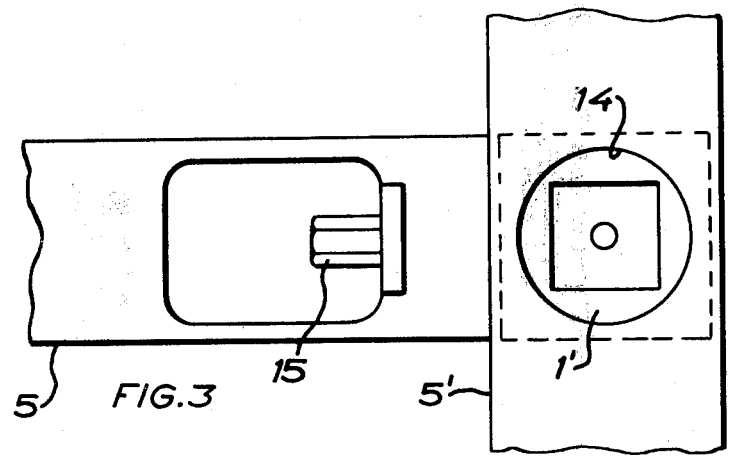
FIG. 3 shows the invention in another application to the tube of quadrangular section.
Figure 2A:
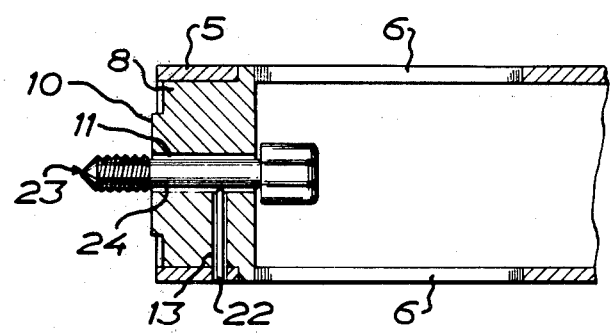
FIG. 2A is a sectional view of the structure of FIG. 2 shown in a similar relation with the assembly screw mounted therein.

The fastening device according to the present invention is shown by way of example in FIGS. 1–3 in a form applied to the joining of tubes of quadrangular section via a connecting element.

The connecting elements 1 and 2 illustrated in FIG. 1 are in the form of a cube and a three-sided prism, respectively, which in cross section is in the form of an equilateral triangle. Quadrangular recesses 3 are formed in the square side surfaces of the elements 1 and 2, and holes 4 are bored and screw-threaded in the centres of said side surfaces.

A tube 5 of quadrangular section, for instance of steel, which is to be connected with any one of the elements 1 and 2 at right angles to one of their side surfaces, is formed with openings 6 (see FIG. 2) in two of its opposed side surfaces which define the through bore in the tube 5. Each of said openings 6 has an edge surface 7 close to the open end of said tube where the joint is to be established, said edge surface being parallel with the plane of the tube end. These openings 6 may be formed by simple punching.

A butting member 8 is insertible through said openings 6 so that stepped surfaces or shoulders 9 on the butting member will bear against the edge surfaces 7. A stud 10 of a shape substantially corresponding to that of the recesses 3 is disposed on the end of the butting member 8 facing the cavity open to the end of the tube 5. The butting member 8 which may be made of aluminum as the element 1, further has a through hole 11 which in the mounted position of the butting member in the tube 5 lies on the axis of symmetry of the tube. After being mounted in the tube 5, the butting member 8 can be locked by means of a pin 22 which is passed under press fit into registering holes 12 and 13 in the tube and the butting member, respectively, and a short distance into the hole 11 in which a screw having a groove 24 around its periphery has been inserted beforehand, the width of said groove measured along the length of the screw being such that the apex of the screw is retractible flush with the mouth of the hole 11 in the stud 10.

After the above extremely simple mounting of the butting member 8 with its screw in the tube 5 and locking it by means of the pin, the unit thus obtained is readily fixed in a connecting element 1 or 2 by screwing the screw into one of the holes 4 and tightening it therein, the stud 10 being fitted into the recess 3.

At the tightening of the screw the butting member 8 and, because the shoulders 9 are engaged with the edge surfaces 7, the tube 5 also is pulled towards the respective side surface of the connecting element, the tube end bearing against said side surface and the stud 10 preventing, due to its cooperation with the recess 3, the connecting element and the tube from being relatively rotated, while the butting member 8 does not contact the side surface or the bottom of the recess 3. The side surface of the element and the end edges of the tube fitting said side surface are thus determinative of the fixation of the connecting element and the tube in relation to each other.

As will be realized from the above description, the present invention provides a fastening device which is simple and inexpensive in manufacture, besides is readily made and unmade and gives the final joint an extraordinary strength since the tube is but insignificantly weakened as a result of the openings 6. As the screw is wholly retractible within the butting member a tube of rectangular section can be mounted and dismounted between two connecting elements which are already fixed in their positions. This latter feature essentially facilitates supplementation and reconstruction of existant frames.

This latter advantage is also significant for the embodiment according to FIG. 3 where a connecting element 1' of the same cross-sectional shape as the tube 5' of quadrangular section is inserted in another, preferably vertically positioned tube 5' of quadrangular section to a position opposite openings 14 formed in the side walls of said tube 5', whereby the tube 5 can be joined to the element 1' and thus to the tube 5' in the same way as has been described in the foregoing. As an alternative of the embodiment according to FIG. 3 the opening 14, when given a suitable design, may replace the recess 3 in the element 1'. FIG. 3 also shows the screw 15 which is accessible for tightening purposes through the openings in the side walls of the tube 5, whereby tubes of quadrangular section can be fastened on opposite sides of the connecting element.

A connecting element in the form of an up right of tube 1 of quadrangular section is shown in FIG. 4. Two parallel rows of holes 16 are formed in two opposite sides of said tube 1''.

The tube 1'' of quadrangular section is shown in side view in FIG. 5 and partially slit along one of the rows of holes 16. An elongated part 5'' which is to be joined to the connecting element 1'' has a longitudinal cavity or bore 17 which is defined by at least two opposite walls of the part 5'', and which extends from an enlarged cavity portion 18 open to the end of the part 5'' where the joint is to be established, to an opening or recess 6'' formed in one side of the part 5'' and separated from the end thereof where the joint is to be established. A sleeve-shaped butting member 8'' is fitted into the opening 6'' in which it is insertible from the side, and has a hole 11'' corresponding to the bore 17. Moreover, a screw 15'' is insertible from the end of the part 5'' through the bore 17 and the hole 11'', and a nut 19 can be screwed onto said screw 15'' inside the butting member 8''. The head of the screw 15'' which will thus be situated at the open end of the part 5'' is formed as a hook means comprising two parallel metal plates 20 fixed, for instance by welding, to the outer end of the screw and each having two hooks 21.

The distance between the plates 20 agrees with the spacing between the rows of holes 16 in the connecting element 1''. The thickness of the plates 20 is the same as or slightly less than the width of the holes 16, and the height of the hooks 21 is the same as or slightly less than that of the holes 16. Moreover, the spacing of the hooks 21 of each plate 20 is the same as that of two holes 16 in each of the rows of holes. Finally, the width of the plates 20 suitably is less than or equal to the depth of the cavity 18 so that the plates 20 are wholly retractible within the recess 18, which makes it possible to mount the part 5'' between two connecting elements 1'' of fixed positions. A further hole may be required in the butting member 8'' opposite to the hole 11''', and moreover it may be necessary to lengthen the bore 17 in the part 5'' for receiving the screw 15''.

When the elongated part 5'' is joined to the connecting element 1'' the butting member 8'' is first passed into the recess 6'', the screw 15'' is inserted in the bore 17 and the hole 11'' and the nut 19 is screwed onto the screw 15'', and then the hook means 20 is inserted in a group of four holes 16 in the tube 1'' and is moved along said tube so that the hooks 21 engage the edges of the holes 16. At the subsequent tightening of the screwed connection formed by the screw 15'' and the nut 19, the butting member 8'' and, as a consequence, the part 5'' is pulled towards the connecting element 1'', whereby a firm connection is realized. The part of the hook means 20 lying outside the connecting element 1'' is received in the cavity 18 open to the end of the part 5''.

The part 5'' has been shown in the drawing as being substantially solid. Said part may be made of wood, plastics or like material, but it may of course also be constructed in the way exemplified in connection with FIGS. 1–3. Of course, the type of butting member shown therein may be used. The sleeve-shaped butting member 8'', however, can be used also in this case but should then suitably be combined with a guide member receiving it, which member fits and is insertible between the walls of the elongated part.

Moreover, the connecting element may be formed as a bar or a tube having one or more groups of two, for instance longitudinal, confronting flanges with an intervening slot (see FIG. 7). The hook means may be formed by two opposed arms which suitably are at right angles to the screw, forming with it a T (see FIG. 8). Further, these arms are so designed as to be insertible behind the flanges with the screw projecting through the intervening slot so that the arms engage the inner sides of the flanges when the screwed connection is tightened. With a suitable design of the transverse arms, this hook means can also cooperate with a connecting element having holes with a wider portion, in which the arms are insertible, and a narrower portion the width of which approximately corresponds to the diameter of the screw 15''; the arms engaging the edges of the holes when the screwed connection is tightened (see FIG. 9).

It should finally be observed that the invention is not restricted to the embodiments described above and shown in the drawings since many modifications are conceivable within the scope of the appended claims. Thus, the connecting elements may have various other shapes than those illustrated. Instead of the tube of quadrangular section, other elongated parts, such as U-bars and tubes of other profiles having two opposed side walls in which the openings 6 may be formed, can be assembled with connecting elements. In the case of U-bars and profiles the walls of which are not particularly resistant to bending, the edge surfaces 7 and the shoulders 9 are preferably formed in such a way that upon tightening of the screw the side walls are pressed against the sides of the butting member 8. The opposed walls of course need not be straight and parallel but may be curved as in tubes of round profile. It is realized that with tubes of round profile there is no need for means preventing rotation of the component parts.

I claim:

1. In a fastening device for detachably joining, with the aid of screwed connections, a connecting element and at least one elongated part having a longitudinal cavity which is open over at least some distance to that end of said part where the joint is to be established and which is laterally defined by at least two opposed walls of said elongated part, an opening which is separated from that end of said part where the joint is to be established, a butting member fitting between said walls and engaging the edge surface of said opening by the intermediary of a shoulder which protrudes beyond said edge surface, said butting member having a through hole directed towards the open end of said part, and a screw insertible in said hole and tightenable through said opening, the screwed connection connecting the butting member and the connecting element and, when tightened, pulling the butting member and consequently the elongated part towards the connecting element, said butting member and said screw being retained in the elongated part by means of a pin which is inserted through aligned holes in one side wall and said butting member transversely of said through hole therein, said pin extending into an annular groove in the periphery of the screw, the width of said groove being such that the apex of said screw is retractible flush with the mouth of said through hole in said butting member.

2. A fastening device for detachably joining, with the aid of screwed connection, an upright having at least one engageable edge and at least one elongated part having a longitudinal cavity which is open over at least some distance to that end of said part where the joint is to be established and which is laterally defined by at least two opposed walls, said device comprising, in at least one of the opposed walls of said elongated part, an opening which is spaced from that end of said part where the joint is to be established, a butting member fitting between said walls and engaging the edge surface of said opening by the intermediary of a shoulder on said butting member which protrudes beyond said edge surface, said butting member having a through hole directed towards the open end of said part, and a screw insertible in said hole and tightenable through said opening, said screw at that end of the elongated part where the joint is to be established having hook means engageable with said edge, and being tightenable by means of a nut which is accessible through said opening in the elongated part, the screwed connection connecting the butting member and the upright end, when tightened by means of said nut, pulling the butting member and, as a consequence, the elongated part towards the connecting element, characterized in that the hook means comprises two parallel metal plates which are fixed as by welding to one end of the screw and each have two hooks for engagement with one edge.

3. A device as claimed in claim 1, characterized in that the openings in the side walls of the elongated part are sufficiently large to permit insertion of the butting member, and said butting member has a stud which fits a recess in the connecting element for preventing relative rotation between the connecting element and the elongated part.

4. A device as claimed in claim 2, characterized in that the butting member is in the form of a sleeve fitting in the opening in the elongated part.

* * * * *

UNITED STATES PATENT OFFICE
CERTIFICATE OF CORRECTION

Patent No. 3,915,579     Dated October 28, 1975

Inventor(s) Adrian Gottfried Offenbroich

It is certified that error appears in the above-identified patent and that said Letters Patent are hereby corrected as shown below:

On the front page, under Item [30], the Foreign Application Priority Data should read:

July 27, 1973   Sweden ..........................7310424-2

Signed and Sealed this thirtieth Day of March 1976

[SEAL]

Attest:

RUTH C. MASON
Attesting Officer

C. MARSHALL DANN
Commissioner of Patents and Trademarks